L. E. HOFFMAN.
DIFFERENTIAL DRIVING GEAR.
APPLICATION FILED OCT. 26, 1908.
Reissued Jan. 4, 1910.
13,068.
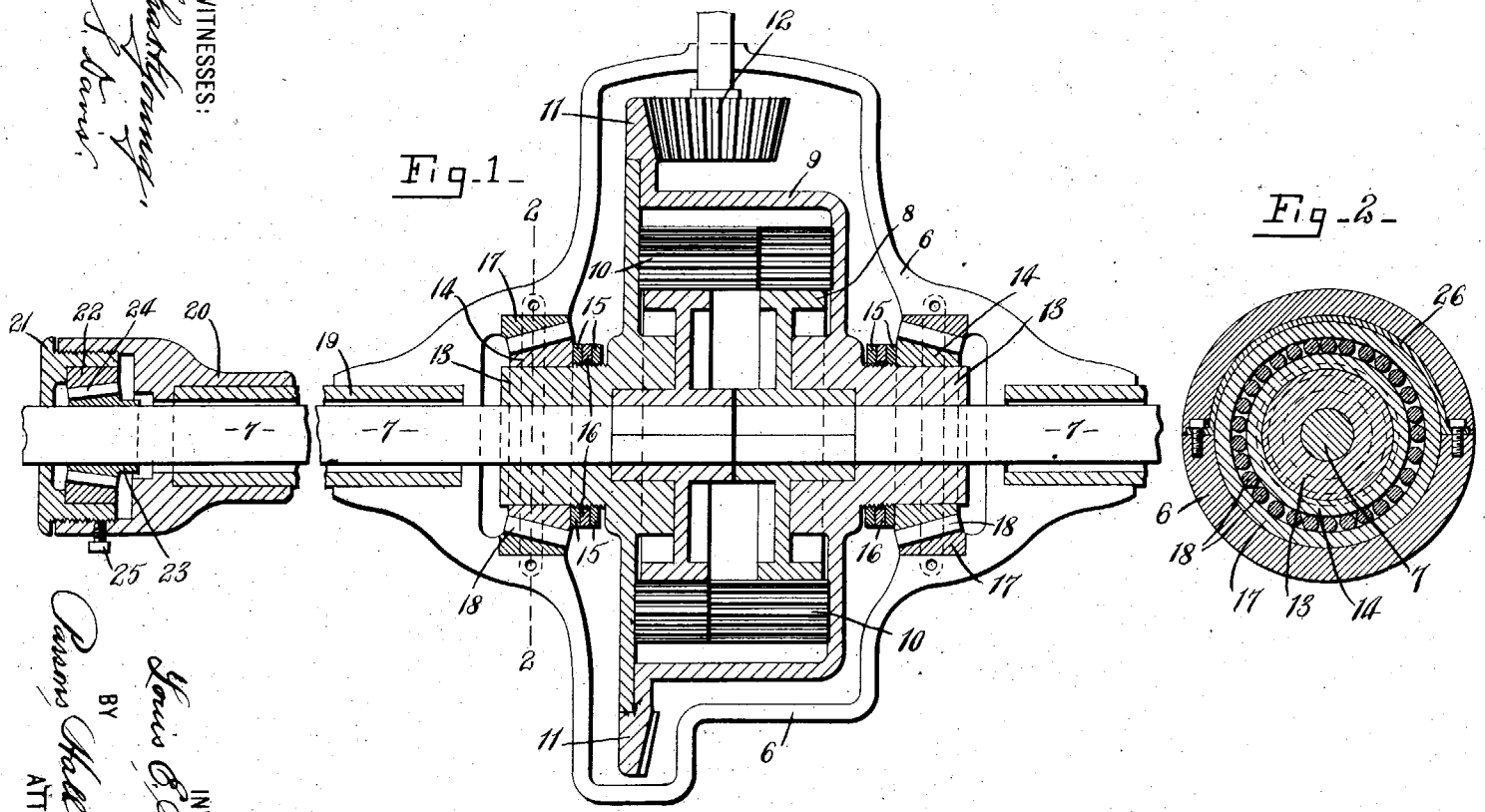
WITNESSES:
Chas. H. Young,
S. Davis.
INVENTOR
Louis E. Hoffman
BY
Parsons, Hall & Bordell
ATTORNEYS

UNITED STATES PATENT OFFICE.

LOUIS E. HOFFMAN, OF PHILADELPHIA, PENNSYLVANIA.

DIFFERENTIAL DRIVING-GEAR.

13,068. Specification of Reissued Letters Patent. Reissued Jan. 4, 1910.

Original No. 834,619, dated October 30, 1906, Serial No. 167,429. Application for reissue filed October 26, 1908. Serial No. 459,658.

*To all whom it may concern:*

Be it known that I, LOUIS E. HOFFMAN, of Philadelphia, in the county of Philadelphia, in the State of Pennsylvania, have invented new and useful Improvements in Differential Driving-Gear, of which the following is a specification.

This invention relates particularly to differential driving-gears for automobiles, said gear being mounted upon the rear or driving axle and acting to allow the traction-wheels to turn at different speeds necessary when the vehicle turns a curve.

The object of the invention is to provide an improved bearing for the planetary or equalizing gear-wheel and means for adjusting those bearings to keep the differential gear in proper alinement with respect to the main axles.

Heretofore it has been customary to mount the differential or planetary gear wheel or casing upon bearings on the main driving-axle, and this has the objection that as the bearings become worn the differential will become crowded or moved sidewise, particularly where there is a bevel-drive, thus throwing the differential out of alinement and making a loose connection at the bevel-gearing. My invention avoids these defects by mounting the differential on bearings in the inclosing jacket or housing instead of on bearings on the axle. This construction has the further advantage that the differential is supported independently in the housing and the main axles can be removed and inserted without disturbing the differential. Also the bearings of the differential can be tightened or adjusted to take up wear.

In the accompanying drawings, Figure 1 is a longitudinal section of an embodiment of my invention, and Fig. 2 is a cross-section on the line 2 2 of Fig. 1.

Referring specifically to the drawings, 6 indicates the housing which contains the differential gearing. This housing is split, and the upper half is removable to enable the gearings and bearings to be got at and adjusted, as hereinafter explained. The main axles which carry the traction-wheels are indicated at 7, and upon their squared ends are fitted the spur-gears 8. The differential gear-casing is indicated at 9. This incloses said spur-wheels and carries pinions 10 in mesh therewith, and upon the outside of this gear-casing is a bevel gear-ring 11, meshing with the driving-pinion 12. These parts are old and are believed to require no further description. It will be understood that when the gear-casing is rotated it will drive the axles, while permitting the differential movement thereof incident to turning a curve.

Instead of finding its bearings upon the hubs of the spur-gears or upon the main axles, as heretofore, the planetary gear-casing is provided by me with bearings upon the housing. To effect this, projecting hubs 13 are secured to the casing 9, and the axle 7 extends through these hubs at an easy fit. The hubs may be formed integral with the casing 9, if desired. Upon the outside of these hubs are bearing cones or rings 14, behind which the hubs are threaded to receive adjusting-nuts 15, between which is a washer 16.

17 indicates bearing cups or rings which are stepped into the housing 6, and the bearings are completed by rollers 18 between the cups and cones. Obviously plain or ball bearings may be used, if desired.

The gear-housing 6 is connected by the tubular axle-casing 19 to the bearing box or case 20 at the end of the axle, and to prevent withdrawal of the axle from the spur-gear of the differential in consequence of any axial thrust a cone-bearing is provided at the end of the axle, comprising a nut 21, screwed into the box 20, a cup 22, carried by the nut, a cone 23, fast in the axle, and rollers 24 between. The nut is held by a screw at 25.

It will be seen that the gear wheel or casing 9 finds its bearings in the housing instead of upon the axles and the housing takes the thrust incident to the bevel-drive instead of causing wear upon the axles and consequent loose contact with the driving-pinion, as heretofore. By means of the nuts 15 the bearings are adjustable to take up all wear and keep the differential in perfect alinement with the axles. To get at the gear for the purpose of adjustment, it is simply necessary to take off the upper half of the housing, and to hold the cup 17 in place when this is done a strap 26 is used. This is bolted to the lower half of the housing and extends around over the cup.

Removal of the axles without unshipping the differential may be readily and quickly performed by taking out the nut 21, after which the whole axle may be slipped out endwise, withdrawing from the spur-gear and leaving the whole differential gear suspended in its own bearings in the housing.

It is obvious that the invention is not limited to the particular form of differential gearing herein shown, nor otherwise than is expressed in the following claims.

What I claim as new, and desire to secure by Letters Patent, is:—

1. The combination with a housing, and a differential gear supported in bearings thereon, of axle-sections extending into the housing and engaged by the gear and removable therefrom without displacing the gear.

2. The combination with axle-sections and a differential mechanism engaged therewith between the same, of a housing over the axle-sections and said mechanism, having supporting-bearings for the mechanism, and thrust-bearings within the housing and upon the axle-sections at the outer ends thereof, preventing outward endwise movement of the axle-sections.

3. The combination with a differential gear, and axle-sections removable therefrom, of a housing having bearings sustaining the gear, and bearing-boxes at the outer ends of the axle, and conical bearings in the boxes, preventing endwise movement of the axle.

4. The combination of a housing having two laterally-extending tubes, a differential drum rotatably mounted on bearings in said housing, two axle-sections independently rotatable in said tubes and in the differential drum, gears loosely mounted on the inner ends of said axle-sections, permitting free endwise removal or withdrawal of the sections from the gears, pinions carried on said differential drum and engaging the gears referred to, and means for rotating said drum.

5. The combination of a split housing, bearing-rings set therein, straps secured at their ends to one part of the housing and extending over the rings to hold the same in place, a differential mechanism in the housing having its bearings on said rings, and axle-sections engaged with the differential mechanism.

6. In a rear axle for automobiles, and in combination two one-piece axle-sections arranged end to end, a differential gearing located at the inner ends of said sections and including a carrying member, and driving gears within the same having loose connection with the axle sections which connections may be broken and established by an endwise movement of the axle sections, a casing inclosing the differential gearing and the axle sections and having bearings for the differential gearing whereby the latter is supported entirely independently of the axle sections, and means for preventing the accidental outward endwise movement of the axle sections, said means including detachable members having parts coacting with the axle sections and parts exposed on the exterior of the casing, said detachable members being removable whereby the axle sections may be withdrawn entirely from the casing and from engagement with said driving gears without dismantling the differential mechanism or removing any parts other than said detachable members.

7. In a rear axle mechanism a differential gearing including two driving gears, a one-piece axle section adapted to be connected to each rear wheel of the vehicle and with one of said driving gears, said differential gearing also including a frame or carrying member having a peripheral engaging part and transmitting gears journaled within the carrying member and intermeshing with said driving gears, said driving gears being separable from the axle section by a mere endwise movement of such axle sections, a casing having a central portion housing the carrying member and provided with bearings therefor, and barrel portions housing the axle sections and adapted to be connected at their outer end portions to the vehicle body, said axle sections extending beyond the ends of the barrel portion, and means located contiguous the outer ends of the axle sections and coacting therewith for holding the same against outward movement, said means being detachable whereby the axle sections may be removed from the casing and from engagement with the driving gears of the differential mechanism leaving the casing and differential mechanism intact.

8. In a rear axle construction for vehicles, and in combination a differential mechanism including a drum or frame having a peripheral driving part, a pair of driving gears arranged side by side within the drum, and transmitting gears journaled in the drum and intermeshing with said driving gears, said transmitting gears having their axes disposed in parallelism with the axis of the drum, said driving gears being provided with non-circular axial openings, an inclosing casing having a part housing said differential mechanism and laterally-extending barrel portions, a one-piece axle-section extending through each barrel portion and removable therefrom through the outer end of the same, each of said axle sections having an end portion non-circular in cross-section designed to enter the axial opening of one of said driving gears to effect an endwise separable non-independently rotatable connection therewith, and detachable means contiguous the outer ends of the axle sections for holding the latter against accidental displacement.

9. In a rear axle mechanism, and in combination a housing including a central portion provided with internal annular bearing surfaces, and with tubular portions disposed axially in reference to said bearing surfaces, a member located within said central portion of the housing and provided with trunnions finding bearings on said annular bearing surfaces and provided peripherally with a toothed portion, a gear journaled in said housing and coacting with said toothed portion, a plurality of sets of gears carried within the member and extending transversely thereof, a pair of driving gears encompassed peripherally by said plurality of sets of gears and arranged side by side between the side walls of the member, and one-piece axle-sections having their inner ends extending through said member and engaging the driving-gears with a slip-fit and means interposed between the tubular portions of the housing and said axle-sections for holding the latter against outward endwise movement, said means being detachable whereby such sections may be wholly withdrawn from the housing without necessitating the removal of any part other than said means last referred to.

10. In a rear axle mechanism for vehicles, a differential gearing, a one-piece axle-section adapted to be connected to each driving wheel of the vehicle and each driving gear of the differential gearing, said differential gearing including a member having side walls and provided with a peripheral driving surface, two driving gears located within the member and rotatable independently thereof and transmitting gears interposed between said driving gears and carried by said member, each of said driving gears being connected to the axle-section associated therewith by a slip-fit connection separable by a mere relative endwise movement and a casing including a central portion housing the member and provided with bearings therefor, and oppositely extending barrel portions adapted to be connected to the body of the vehicle, each axle-section extending beyond the end of the barrel housing said section and detachable means for holding the axle-sections against outward endwise movement, each section by an outward endwise movement being separable from the driving gear associated therewith and removable from the housing with the housing and gears of the differential gearing in assembled position.

In testimony whereof, I have hereunto signed my name in the presence of two attesting witnesses, at Syracuse, in the county of Onondaga, in the State of New York, this 7th day of October, 1908.

LOUIS E. HOFFMAN.

Witnesses:
S. Davis,
E. K. Seemiller.